US008295458B2

United States Patent
Wills et al.

(10) Patent No.: US 8,295,458 B2
(45) Date of Patent: *Oct. 23, 2012

(54) SYSTEMS AND METHODS FOR MONITORING "PAY-AS-YOU-GO" TELECOMMUNICATION SERVICES

(75) Inventors: Harold S. Wills, Great Falls, VA (US); David A. Steinberg, Washington, DC (US)

(73) Assignee: Simplexity, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,377

(22) Filed: Oct. 21, 2011

(65) Prior Publication Data

US 2012/0082301 A1    Apr. 5, 2012

Related U.S. Application Data

(63) Continuation of application No. 11/270,965, filed on Nov. 11, 2005, now Pat. No. 8,068,810, which is a continuation of application No. 10/337,301, filed on Jan. 7, 2003, now Pat. No. 7,013,127.

(51) Int. Cl.
*H04M 15/00* (2006.01)
*H04M 11/00* (2006.01)
(52) U.S. Cl. .................. 379/114.05; 455/406
(58) Field of Classification Search .......... 455/406, 455/408, 407, 26.1, 421, 453, 405, 409; 379/122, 379/114.2, 114.23, 116, 118, 120, 124, 127.01, 379/134, 114.01, 37
See application file for complete search history.

(56) References Cited

U.S. PATENT DOCUMENTS

| | | |
|---|---|---|
| 4,650,219 A | 3/1987 | Sigman |
| 5,325,419 A | 6/1994 | Connolly et al. |
| 5,353,331 A | 10/1994 | Emery et al. |
| 5,425,087 A | 6/1995 | Gerber et al. |
| 5,475,740 A | 12/1995 | Biggs, Jr. et al. |
| 5,479,411 A | 12/1995 | Klein |
| 5,506,887 A | 4/1996 | Emery et al. |
| 5,557,664 A | 9/1996 | Burns et al. |
| 5,579,379 A | 11/1996 | D'Amico et al. |
| 5,594,740 A | 1/1997 | LaDue |
| 5,604,788 A | 2/1997 | Tett |
| 5,625,669 A | 4/1997 | McGregor et al. |
| 5,633,919 A | 5/1997 | Hogan et al. |
| 5,635,918 A | 6/1997 | Tett |
| 5,724,407 A | 3/1998 | Bruno et al. |

(Continued)

FOREIGN PATENT DOCUMENTS

WO    WO-0182582    11/2001
(Continued)

OTHER PUBLICATIONS

In the U.S. Patent and Trademark Office, Notice of Allowance in re: U.S. Appl. No. 10/337,301, dated Sep. 20, 2005, 7 pages.

(Continued)

*Primary Examiner* — Melody Mehrpour
(74) *Attorney, Agent, or Firm* — Patton Boggs LLP

(57) ABSTRACT

Telecommunication services systems and methods are disclosed. The telecommunication services systems and methods preferably enable the user and/or the responsible party to make payments as the user uses the telecommunication services. The systems and methods may also be employed to provide the user and/or the responsible party with specialized pricing options and other customized services.

8 Claims, 2 Drawing Sheets

U.S. PATENT DOCUMENTS

| | | | |
|---|---|---|---|
| 5,742,668 A | 4/1998 | Pepe et al. |
| 5,742,905 A | 4/1998 | Pepe et al. |
| 5,758,088 A | 5/1998 | Bezaire et al. |
| 5,845,203 A | 12/1998 | LaDue |
| 5,867,566 A | 2/1999 | Hogan et al. |
| 5,872,926 A | 2/1999 | Levac et al. |
| 5,912,956 A | 6/1999 | Longo et al. |
| 5,951,638 A | 9/1999 | Hoss et al. |
| 5,959,543 A | 9/1999 | LaPorta et al. |
| 5,987,100 A | 11/1999 | Fortman et al. |
| 6,002,750 A | 12/1999 | Ertz |
| 6,023,499 A | 2/2000 | Mansey et al. |
| 6,061,718 A | 5/2000 | Nelson |
| 6,072,862 A | 6/2000 | Srinivasan |
| 6,073,029 A | 6/2000 | Smith et al. |
| 6,118,860 A | 9/2000 | Hillson et al. |
| 6,178,331 B1 | 1/2001 | Holmes et al. |
| 6,185,545 B1 | 2/2001 | Resnick et al. |
| 6,212,506 B1 | 4/2001 | Shah et al. |
| 6,282,276 B1 | 8/2001 | Felger |
| 6,317,490 B1 | 11/2001 | Cameron et al. |
| 6,324,528 B1 | 11/2001 | Hillson et al. |
| 6,393,114 B1 | 5/2002 | Gasthaus et al. |
| 6,397,055 B1 | 5/2002 | McHenry et al. |
| 6,424,706 B1 | 7/2002 | Katz et al. |
| 6,442,406 B1 | 8/2002 | Harris et al. |
| 6,483,907 B1 | 11/2002 | Wong et al. |
| 6,529,593 B2 | 3/2003 | Nelson |
| 6,539,082 B1 | 3/2003 | Lowe et al. |
| 6,553,108 B1 | 4/2003 | Felger |
| 6,668,046 B1 | 12/2003 | Albal |
| 6,697,468 B2 | 2/2004 | Wong et al. |
| 6,704,563 B1 | 3/2004 | Senn et al. |
| 7,143,066 B2 | 11/2006 | Shear et al. |
| 7,245,901 B2 | 7/2007 | McGregor et al. |
| 7,450,927 B1 | 11/2008 | Creswell et al. |
| 7,486,945 B2 * | 2/2009 | Senn et al. ................... 455/406 |
| 7,568,615 B2 * | 8/2009 | Corona et al. ................ 235/379 |
| 7,711,097 B2 * | 5/2010 | Ji et al. ...................... 379/114.2 |
| 7,801,515 B1 | 9/2010 | Nilsson |
| 8,090,707 B1 * | 1/2012 | Orttung et al. ................ 707/710 |
| 2002/0111153 A1 | 8/2002 | Hartmaier et al. |
| 2004/0105424 A1 | 6/2004 | Skoczkowski et al. |
| 2009/0154675 A1 | 6/2009 | Hanson |
| 2010/0009654 A1 | 1/2010 | Fougnies et al. |
| 2010/0191612 A1 | 7/2010 | Raleigh |
| 2011/0173695 A1 | 7/2011 | Ginter et al. |

FOREIGN PATENT DOCUMENTS

| | | |
|---|---|---|
| WO | WO-0211422 | 2/2002 |

OTHER PUBLICATIONS

In the U.S. Patent and Trademark Office, Final Office Action in re: U.S. Appl. No. 10/337,301, dated Jun. 3, 2005, 9 pages.

In the U.S. Patent and Trademark Office, Office Action in re: U.S. Appl. No. 10/337,301, dated Nov. 30, 2004, 5 pages.

In the U.S. Patent and Trademark Office, Notice of Allowance in re: U.S. Appl. No. 11/270,965, dated Jul. 22, 2011, 5 pages.

In the U.S. Patent and Trademark Office, Final Office Action in re: U.S. Appl. No. 11/270,965, dated Apr. 8, 2011, 10 pages.

In the U.S. Patent and Trademark Office, Office Action in re: U.S. Appl. No. 11/270,965, dated Sep. 15, 2010, 11 pages.

In the U.S. Patent and Trademark Office, Final Office Action in re: U.S. Appl. No. 11/270,965, dated Dec. 29, 2009, 8 pages.

In the U.S. Patent and Trademark Office, Office Action in re: U.S. Appl. No. 11/270,965, dated Mar. 10, 2009, 7 pages.

In the U.S. Patent and Trademark Office, Final Office Action in re: U.S. Appl. No. 11/270,965, dated Aug. 11, 2008, 6 pages.

In the U.S. Patent and Trademark Office, Office Action in re: U.S. Appl. No. 11/270,965, dated Jan. 9, 2008, 6 pages.

* cited by examiner

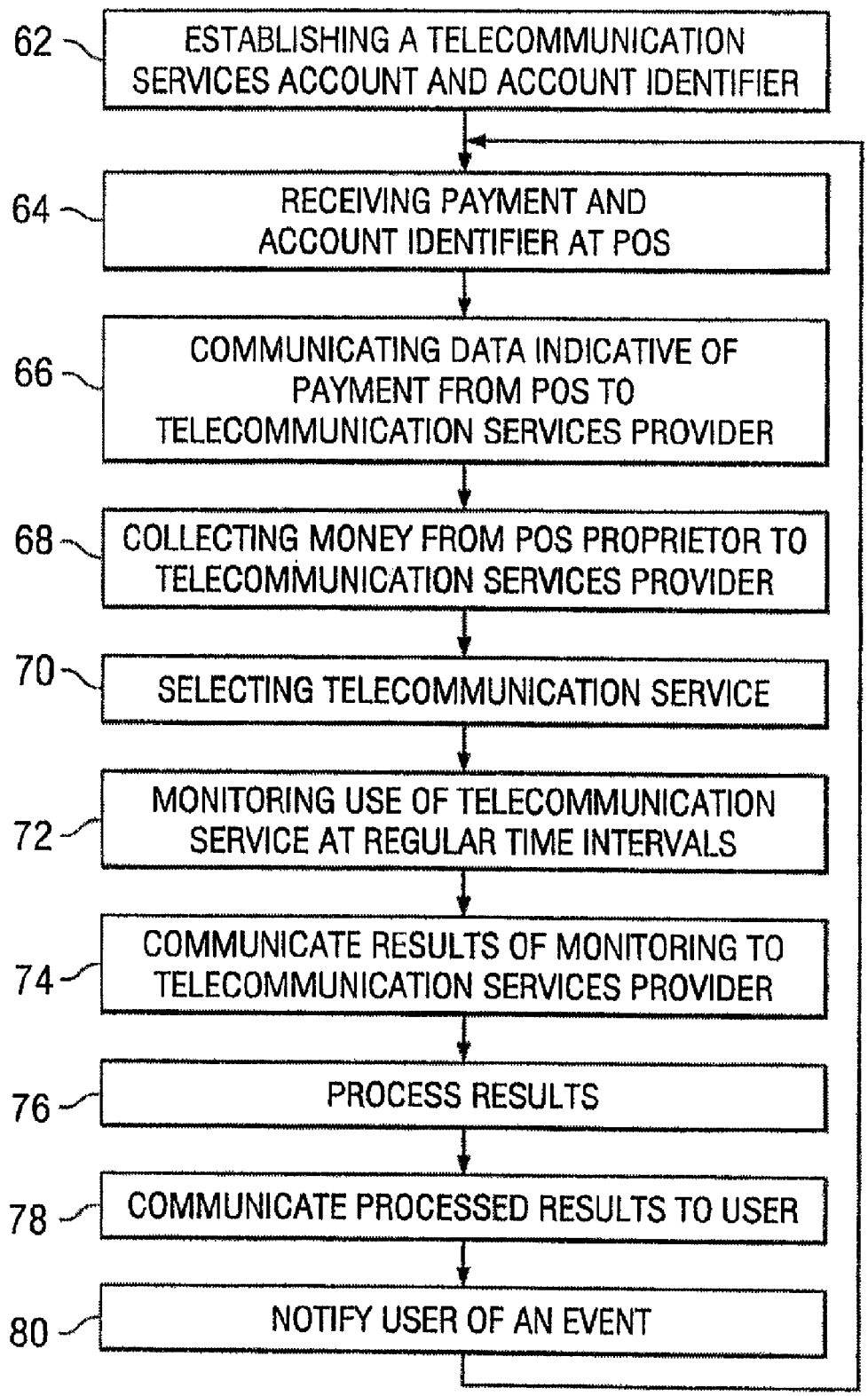

SYSTEMS AND METHODS FOR MONITORING "PAY-AS-YOU-GO" TELECOMMUNICATION SERVICES

CROSS-REFERENCE TO RELATED APPLICATIONS

This application is a continuation of U.S. application Ser. No. 11/270,965, filed Nov. 11, 2005 now U.S. Pat. No. 8,068,810, which is a continuation of U.S. application Ser. No. 10/337,301, filed Jan. 7, 2003, now U.S. Pat. No. 7,013,127. The aforementioned applications are incorporated by reference in their entirety.

BACKGROUND OF THE INVENTION

1. Field of the Invention

The present invention relates to telecommunication services systems and methods, and in particular, to telecommunication services systems and methods that enable the user to make payments as the user uses the telecommunication services. The systems and methods may also be employed to provide the user with specialized pricing options and other customized services.

2. Description of the Prior Art

It is known in the art of telecommunication services to provide calling card accounts to customers. A customer receives account information in the form of a personal identification number ("PIN") and a toll free access number that allows the customer to utilize the account. The accounts are generally one of two types: (1) a pre-paid account, which is an account with a pre-defined amount of usage paid for in advance by the customer; and (2) a usage-based account, which is an account that is billed on a periodic billing cycle according to usage during the billing period.

Pre-paid wireless (cell phone) service provides an illustrative example. Pre-paid wireless service enables customers to utilize the convenience of cellular and digital communications by establishing a prepaid account with a wireless telecommunication vendor. Typically, prepaid wireless cards, each card corresponding to a wireless services account, are purchased in preset denominations in a limited number of locations. The cards are issued in fixed value increments, for example, $20, $50 or $100. Each card provides the user with a specified amount of wireless calling dollars or minutes. After the initial allocation is exhausted (or before), the user can "recharge" or reload their wireless account usually by calling an 800 number, having a credit card handy, and either talking with a customer service representative (CSR) or using an automated system to charge additional minutes to the credit card.

U.S. Pat. No. 6,185,545 discloses a method for effecting payment of goods or services. The method includes establishing an intermediary account and associating the intermediary account with a user account maintained by a vendor. The method permits the user to, e.g., pre-pay for telecommunication services.

U.S. Pat. No. 6,282,276 discloses a method for billing a value-added service call. Value-added service calls include calls that have traditionally been "800" or "900" number calls.

U.S. Pat. No. 6,397,055 discloses a system and method for charging a pre-paid wireless call user.

U.S. Pat. No. 6,424,706 discloses a system and method for accessing the value associated with a pre-purchased amount of telecommunication time.

WO 01/82582 A2 discloses a communication billing system that provides interrelated processing of wireless service events and wire line service events.

WO 02/11422 A2 discloses a communication account system for dynamically providing communication accounts to communication devices for immediate transfer to users. The system includes a means of determining an amount of prepaid time for a communication.

The pre-paid systems such as those discussed above are burdensome to both the user and the telecommunication services provider. There is thus a need for a system and method for affecting payment for telecommunication services that enables a user to pay as the user uses the telecommunication services. There is also a need for a system and method that provides convenient payment options to the user.

SUMMARY OF THE INVENTION

An object of the present invention is to provide systems and methods that enable a user of telecommunication services to make payments as the user uses the telecommunication services. Examples of the telecommunication services include, but are not limited to, telephone calls, data calls, audio transfers, video transfers, e-mail sessions, voice mail sessions, video mail sessions, web sessions, and/or other services provided over a telecommunication network.

These services include wireless services, wire line services and internet ("on-line") services.

Another object of the present invention is to provide systems and methods that enable the user of telecommunication services to determine the cost of the telecommunication services as the user uses the services. In accordance with this object, a total charge for the user's use of the telecommunication services that is based on the actual time that the user is using the telecommunication services is calculated via a telecommunication services provider network when the user terminates use of the services. Call charge information associated with the use of the telecommunication services is virtually simultaneously accessible by the user when the use of the services is terminated, the call charge information including information regarding the amount representing a charge for the use of the telecommunication services.

According to another embodiment, the system and method comprise a notification system. The notification system may be an interactive voice notification system, an on-line notification system, a short message service ("SMS") notification system, a multimedia service ("MMS") notification system or any other similar service that may be provided over a telecommunication network. The interactive voice notification system provides the user with a voice mail message at a designated phone number. The on-line notification system provides an e-mail message to the user at a designated e-mail address. The SMS notification system provides a short text message over any telecommunication network. The MMS notification system provides video, voice or any other multimedia service or capability that may arise over a telecommunication network. The user then accesses his account information by calling a specified number, and/or by logging in using an identifier by communication to and/or from a SMS or a MMS. The user may then purchase more time if desired.

Another object of the invention is to provide systems and methods that provide the user of telecommunication services with specialized pricing options and other customized services related to the user's use of the telecommunication services.

According to another object of the invention, the system comprises an e-mail system and the method comprises the use of the e-mail system. The system and method involve the user using the e-mail system to access account information and to make payment, if required, for use of the telecommunication services. The user may also use the e-mail system to access additional information related to the use of the telecommunication services. In accordance with this object, a system and method for accessing information and for effecting payment for telecommunication services are provided. The system and method comprise establishing a telecommunication services account for a telecommunication services user, wherein said telecommunication services user is provided with a corresponding account identifier; and conducting a transaction via an e-mail system at the user's request, wherein said transaction requires the user's use of the account identifier.

According to another object of the invention, the system comprises a web server and the method comprises the use of the web server. The system and method involve the user using the web server to access account information and to make payment, if required, for use of the telecommunication services. The user may also use the web server to access additional information related to the use of the telecommunication services. In accordance with this object, a system and method for accessing information and for effecting payment for telecommunication services are provided. The system and method comprise establishing a telecommunication services account for a telecommunication services user, wherein said telecommunication services user is provided with a corresponding account identifier; and conducting a transaction via a web server at the user's request, wherein said transaction requires the user's use of the account identifier.

According to another object of the invention, the system comprises an interactive voice system ("IVS") and/or an interactive data system ("IDS"). The method involves the user using the IVS and/or the IDS to access account information and to make payment, if required, for use of the telecommunication services. The user may also use the IVS and/or IDS to access additional information related to the use of the telecommunication services. In accordance with this object, a system and method for accessing information and for effecting payment for telecommunication services are provided. The system and method comprise establishing a telecommunication services account for a telecommunication services user, wherein said telecommunication services user is provided with a corresponding account identifier; and conducting a transaction via an IVS and/or an/ IDS at the user's request, wherein said transaction requires the user's use of the account identifier.

According to yet another object of the invention, a system and method for effecting payment for telecommunication services at a designated location, e.g., a "point-of-sale," are provided. The system and method comprise establishing a telecommunication services account having a corresponding account identifier; conducting a payment transaction comprising receiving a payment from a user at a point-of-sale together with the account identifier; communicating data indicative of the payment transaction from the point-of-sale to a telecommunication services provider; and collecting an amount of money equal to the payment amount, subject to adjustment, from a point-of-sale proprietor to the telecommunication services provider. The point-of-sale can be, e.g., a retail merchant site; a vending machine; and an automated teller machine (ATM). The payment at the point-of-sale can be made, e.g., in the form of cash; as a debit card transaction; and as a credit card transaction effected via communication with a computer.

These and other objects of the invention will be apparent to those of ordinary skill in the art from the following Detailed Description.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 2 is a flowchart illustrating a process for monitoring "pay-as-you-go" telecommunication services according to one embodiment of the invention.

DETAILED DESCRIPTION OF THE PREFERRED EMBODIMENTS

Figure 1:
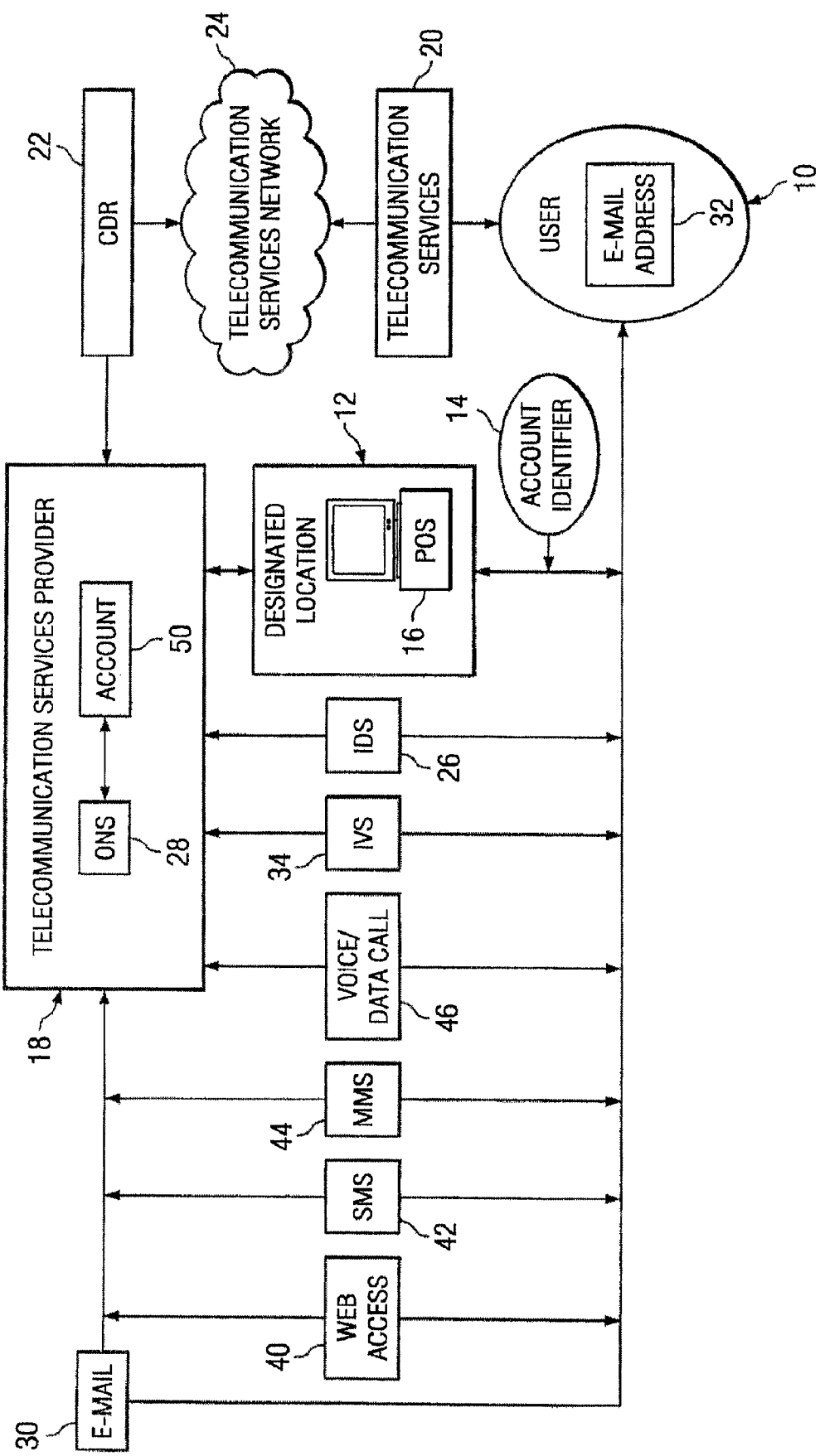
FIG. 1 is a conceptual diagram of a system for monitoring "pay-as-you-go" telecommunication services according to one embodiment of the invention.

All patents and patent publications cited herein are hereby incorporated herein by reference.

Most telecommunication services providers require that the user pay in advance. If the user does not use the telecommunication services, the amount paid is not given back to the user. The systems and methods of the present invention allow the user to pay as the telecommunication services are being used (otherwise known as "pay-as-you-go"). Pay-as-you-go is a user driven-service that permits the user to conveniently make payment for telecommunication services. Various embodiments of the present invention are described in further detail in the remainder of the detailed description, as illustrated in FIG. 1 and FIG. 2 using like reference numerals to those identified herein.

The systems and methods permit the user 10 to make payment electronically, i.e., via credit card, debit card, check card or any other such means including on-line banking; or to make payment in cash, i.e., wherein the user 10 can make payment at a designated location 12, wherein the amount paid at the designated location 12 is credited to the user's account 50 in order to make payment for the services rendered in step 68 of FIG. 2. In order to use the designated location 12, the user 10 will be issued an account identifier 14, e.g., a plastic card, in step 62 of FIG. 2 that identifies the user 10. The account identifier 14 permits the user 10 to make payment at the designated location in step 64 of FIG. 2. This may be done, e.g., via a point-of-sale ("POS") terminal 16, wherein the user's card is "swiped" to identify that the user 10 is paying a specified amount of cash. This information is then relayed to the telecommunication services provider 18 in step 66 of FIG. 2. The designated location 12 can be any location that processes a credit card, e.g., retail stores such as the dry cleaners, the drug store, the supermarket, etc. The benefit to the retail store providing such a service would be a commission for providing the service.

The systems and methods are configured so as to monitor the user's use of the telecommunication services at regular time intervals in step 72 of FIG. 2, e.g., at 5, 10, 15 or 30 minute intervals. When the user 10 completes use of the telecommunication services 20, the user 10 may then access a call detail record ("CDR") 22, which is sent from a telecommunication services network 24 to the telecommunication services provider 18 in step 74 of FIG. 2, who is then able to produce the equivalent of an updated invoice in step 76 of FIG. 2. All telecommunication services charges, including, e.g., information "411" charges, operator assistance, etc., are included. The telecommunication services provider 18 then relays this information in step 78 of FIG. 2 back to the user 10 via e-mail 30; via interactive web access 40; via SMS 42, via MMS 44; and/or via a voice and/or a data call 46, e.g., if the user 10 is at a pre-designated limit, the telecommunication services provider 18 can notify the user 10 of such.

According to an embodiment of the invention, the system and method comprise an interactive voice system ("IVS") 34 and/or an interactive data system ("IDS") 26. The IVS 34 and/or the IDS 26 permit a user 10 to conduct a complete range of business with the telecommunication services provider 18. For example, the IVS 34 and/or the IDS 26 may provide notice to the user 10 that the user 10 has a limited amount of time left for use of its telecommunication services 20. The user 10 may then access the IVS 34 and/or the IDS 26 and conduct business with the IVS 34 and/or the IDS 26 as if a service representative was on the line. Secure access can be assured by requiring the user 10 to provide caller identification information, e.g., social security number, driver's license number, or some other information that has previously been provided by the user 10. Once the user 10 is identified, the user 10 may obtain information regarding its telecommunication services 20 in step 78 of FIG. 2, including how much time the user 10 has used, when the user 10 last made payment, etc. Should the user 10 choose to make payment for additional service at this time, the user 10 may do so via credit account information which has previously been provided by the user 10.

According to another embodiment, the system and method comprise an on-line notification system ("ONS") 28. The on-line notification system 28 provides an e-mail message 30 to the user 10 at a designated e-mail address 32. The on-line notification system 28 may also provide an e-mail message 30 to an owner or responsible party of the services. The user 10 and/or the responsible party may then accesses account information on-line by logging in using an identifier. The user 10 and/or the responsible party may then purchase more time if desired.

Use of the telecommunication services 20 may be suspended by the telecommunication services provider 18. Because the use is monitored at regular time intervals, the suspension can be achieved before the user 10 and/or the responsible party accumulates a balance due. When the telecommunication services 20 are suspended, the user 10 and/or the responsible party is automatically directed to an IVS 34 and/or an IDS 26, which, as discussed above, permit the user 10 and/or the responsible party to add money to the account 50. The user 10 and/or the responsible party is thus prevented from spending money that is not in the account 50.

Also, because the use is monitored at regular time intervals, the telecommunications services provider 18 can provide selected time, day and/or date service to the user 10. For example, a user 10 can buy a specified amount of time for the telecommunication services 20, e.g., "anytime" service, nighttime service and/or weekend service. Should the user 10 use up all of its anytime service, e.g., the system can still permit the user 10 to employ other services 20, e.g., nighttime service and/or weekend service only (i.e., exclusive of the anytime service) via a special price plan related to either one or both of these services 20. The service(s) 20 can therefore be portioned by day, date and/or time based on the user's needs. In this example, if the user 10 tries to use the anytime service, the user 10 would be directed to the IVS 34 and/or the IDS 26 discussed above, wherein the user 10 would be asked to make payment for the anytime service via the means described herein.

The user 10 may use the ONS 28 to obtain an invoice or a statement of its account 50. The user 10 may then print the CDR 22 out and submit it with payment as if the CDR 22 was an invoice that came in the mail.

According to another embodiment, the systems and methods of the invention can be employed to provide specialized pricing options to a user 10. A user 10 can thus be charged a base fee for a telecommunication service 20 based on the user's intended use of the service 20. For example, some users 10 may only want to use the service 20 for emergencies. The user 10 will then be charged a small monthly fee (e.g., $5.00). The user 10, however, will have the option to add to the service 20 by the interactive means discussed above in step 70 of FIG. 2. Another example is wherein the telecommunication services provider 18 agrees not to charge for certain calls, e.g., emergency phone calls to and from, e.g., the American Automobile Association ("AAA"). The phone can also be set up so that calls are directed to the AAA via, e.g., the push of one button, via the dial of a specified code and/or via voice recognition. Yet another example of a specialized pricing option is a parent who may want to provide limited access to his/her child. For example, the parent can pay a small monthly fee so long as the child only calls home. If the child uses two or more numbers, additional fees may be charged. In addition, because the calls are monitored at regular time intervals, a parent can be notified when calls are made if so desired.

The systems and methods of the invention also permit a user 10, such as a parent, to monitor the use of the telecommunication services 20, e.g., who is using the service, what service is being used, where the service is being used, when the service is being used and/or how the service is being used (both ingoing and outgoing). The parent may access this information by any of the means discussed above.

The user 10 may also provide information to the telecommunication services provider 18 so that the user 10 is notified upon the happening of an event in step 80 of FIG. 2. For example, the user 10 can ask that the services provider 18 notify the user 10 by e-mail when the user 10 has a voice mail or notify the user 10 if a family member such as an elderly family member dials 911. A "notice tree" can be set up by the user 10 with the telecommunication services provider 18.

While, in the foregoing, the present invention has been described in accordance with specific embodiments, those skilled in the art would appreciate that variations of these embodiments fall within the scope of the invention. As a result, the invention is not limited to the specific examples and illustrations discussed above.

What is claimed is:

1. A computer-implemented method for providing pay-as-you-go internet services to a user comprising:

assigning an account identifier for a pay-as-you-go internet service to a user for conducting one or more online transaction via a web server, wherein said one or more online transaction requires the user's account identifier;

providing the user with an interface to log in using the account identifier;

monitoring data associated with the account identifier, during each instance of use of the pay-as-you-go internet service;

comparing the monitored data to a threshold of use for the account identifier previously set by the user;

preventing the account identifier from exceeding the threshold of use;

providing the user with a virtually simultaneously notification of total charges associated with the account identifier when each of the one or more online transaction ends; and presenting the user with an interactive system operable during each instance of use, to enable the user to make electronic payments for additional use of the pay-as-you-go internet service.

2. The computer-implemented method of claim 1, wherein the threshold of use is associated with money.

3. The computer-implemented method of claim 1, wherein the notification comprises of an SMS message, an e-mail or other online notification.

4. The computer-implemented method of claim 1, wherein the electronic payments are selected from the group consisting of: credit cards, debit cards, check cards, on-line banking accounts or other accounts that support electronic payments.

5. A system for providing pre-paid or pay-as-you-go internet services to a user, the system comprising:

a server, accessible via a telecommunication network, where in the server performs a method comprising:

assigning an account identifier for a pay-as-you-go internet service to a user for conducting one or more online transaction via a web server, wherein said one or more online transaction requires the user's account identifier;

providing the user with an interface to log in using the account identifier;

monitoring data associated with the account identifier, during each instance of use of the pay-as-you-go internet service;

comparing the monitored data to a threshold of use for the account identifier previously set by the user;

preventing the account identifier from exceeding the threshold of use;

providing the user with a virtually simultaneously notification of total charges associated with the account identifier when each of the one or more online transaction ends; and presenting the user with an interactive system operable during each instance of use, to enable the user to make electronic payments for additional use of the pay-as-you-go internet service.

6. The system of claim 5, wherein the threshold of use is associated with money.

7. The system of claim 5, wherein the notification comprises of an SMS message, an e-mail or other online notification.

8. The system of claim 5, wherein the electronic payments are selected from the group consisting of: credit cards, debit cards, check cards, on-line banking accounts or other accounts that support electronic payments.

\* \* \* \* \*